United States Patent [19]

Harris, Sr.

[11] 3,901,413

[45] Aug. 26, 1975

[54] HIGH PRESSURE SYRINGE

[75] Inventor: Rano J. Harris, Sr., Baton Rouge, La.

[73] Assignee: Precision Sampling Corporation, Baton Rouge, La.

[22] Filed: Mar. 1, 1974

[21] Appl. No.: 447,233

[52] U.S. Cl. .............................................. 222/309
[51] Int. Cl. ............................................. B67d 5/18
[58] Field of Search ........ 222/309; 73/23.1; 141/27; 128/218

[56] References Cited
UNITED STATES PATENTS 2,916,057   12/1959   Carle et al. ..................... 222/309 X Primary Examiner—Stanley H. Tollberg
Attorney, Agent, or Firm—Llewellyn A. Proctor

[57] ABSTRACT

A syringe, particularly a microsyringe, useful for receiving and accurately measuring a fluid specimen from a highly pressurized source, for containment at the high pressure, and for subsequently dispensing into an appropriate medium. The syringe is comprised of the usual hollow barrel and reciprocable plunger mounted within the bore at the rear of the barrel. The forward end of the syringe is also provided with the usual cannula, or needle, and is valved. The needle is contained within a tubular adapter which is fitted and movable within a slip fitting provided with an internally fitted resilient tubular seal, the combination constituting a part of a needle assembly. The needle contains a wire providing an annular opening connecting with the dispensing end of the needle. The rearward end of the needle is sealed, and provided with a side opening which extends outside the wall of the slip fitting and within the said resilient tubular seal. Movement of the tubular adapter within the slide fitting causes the side opening of the needle to move inwardly and outwardly within and outside the tubular seal to close or open the valved portion of the syringe. In operation, the dispensing end of the needle can be inserted into a pressurized source of fluid and the valve then opened to withdraw a fluid specimen. The specimen can be accurately measured, and the valve then closed to trap the pressurized fluid. The dispensing end of the needle can then be inserted into a medium, e.g., an inlet to a G.C., mass spectrograph or the like, the valve opened, and the fluid specimen injected.

9 Claims, 4 Drawing Figures

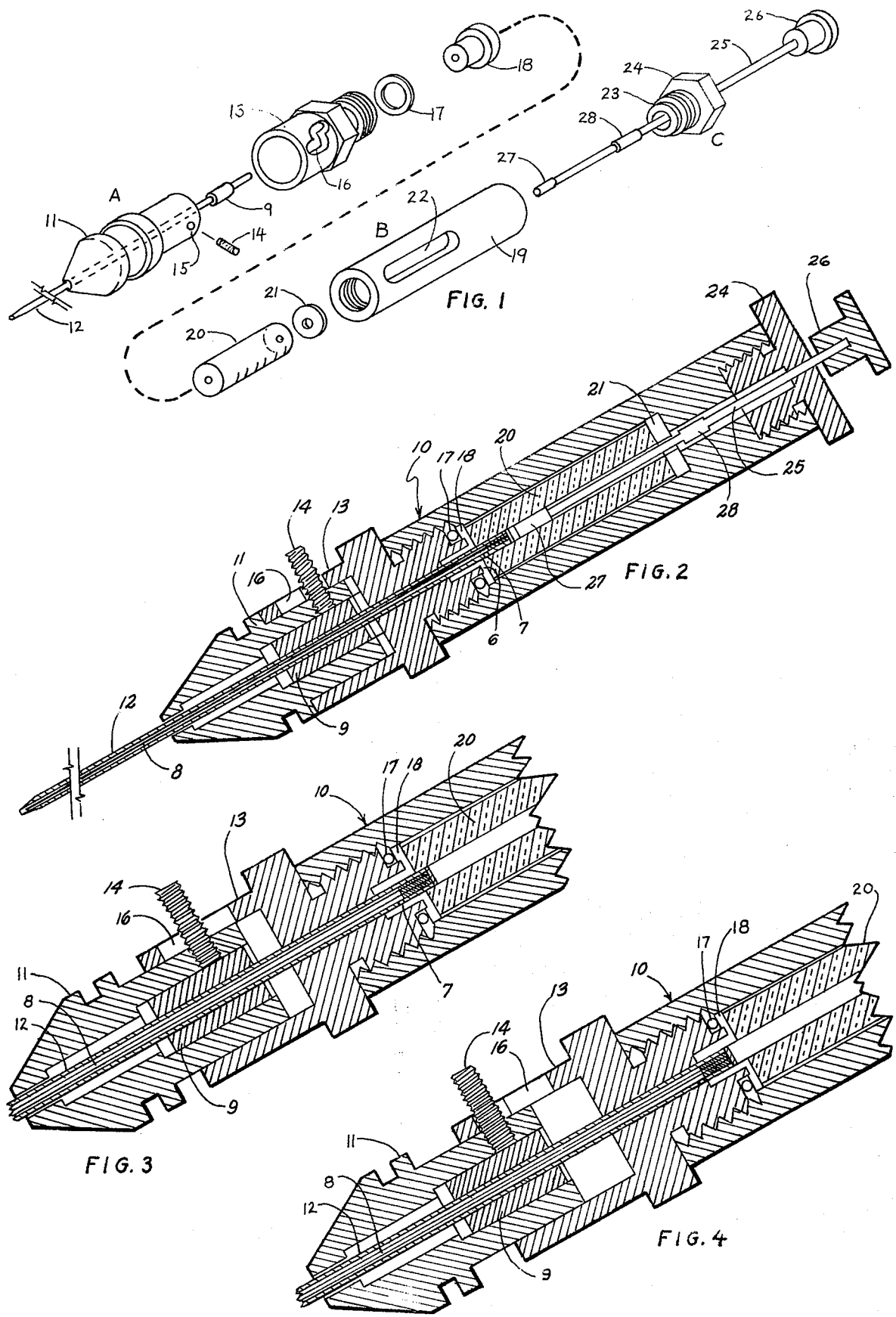

HIGH PRESSURE SYRINGE

It has long been a desideratum in the art to provide a syringe, particularly a microsyringe, suitable for the withdrawal of volatile fluid specimens contained under high pressure, e.g., pressures ranging up to about five hundred pounds per square inch, and higher. Prior art liquid syringes are unsuitable for such use because they are unable to withstand the high pressures without leakage, and even relatively low leakage creates intolerable error in the handling of such infinitesimal quantities of the fluid specimens. Errors in the measurement of the actual volume of sample intended for injection are thus particularly significant in high precision microsyringes of the type used for withdrawal and measurement, and for injection of vary small and infinitesimal quantities of accurately measured specimens into a media, e.g., modern analytical instruments such as a mass spectrometer, gas chromatograph, and the like. Present methods for obtaining fluid specimens from high pressure sources are complex, require considerable operator time for their usage, and leave much to be desired in terms of their accuracy and precision.

It is accordingly a primary objective of the present invention to obviate these disadvantages and provide a new and improved syringe, particularly a microsyringe, capable of withdrawing and measuring fluid specimens from highly pressurized sources.

A specific object of the invention is to provide a syringe of such character which is particularly useful for the withdrawal, measurement, and injection of volatile liquid specimens on the order of only about 0.01 to about 5 microliters, or fractional parts thereof.

A further object of the invention is to provide a syringe of simple construction in which the parts are small in number and can be easily and quickly assembled or reassembled, thereby minimizing the cost of manufacture.

These objects and others are achieved in accordance with the apparatus of the present invention constituting a syringe, particularly a microsyringe, for taking fluid specimens from high pressure media, and for dispensing of the small, preselected, accurately measured quantities of, e.g., pressurized, highly volatile liquid specimens, into media, e.g., the inlet of a G.C., mass spectrograph, or other analytical instrument. The syringe comprises the combination of a barrel formed by an enclosing side wall defining an axial opening, or bore, and a plunger reciprocably mounted within the bore from the rearward end of the barrel, and traversable therethrough. The syringe of this invention also includes a cannula or hollow needle contained within a valved needle assembly. The valved needle assembly includes a tubular adapter, within which the needle is mounted, and the tubular adapter is fitted within a slip fitting which makes up or is affixed upon the forward end of the barrel of the syringe. The rearward end of the slip fitting is provided with a resilient tubular seal, preferably one with a flanged portion which projects outside the rearward wall defining the slip fitting. The tubular adapter is capable of relative movement within the slip fitting, and movement of the tubular adapter in turn moves the needle which is secured thereon. The hollow needle contains a segment of wire of smaller external diameter than the internal diameter of the wall forming the opening through the needle. The wire, in combination with the inner wall of the needle, provides an annular opening in operative communication with the bore of the barrel and with the opening at the dispensing end of the needle. The rearward end of the needle is preferably closed, but provided with a side opening near the rearward end of the needle which is projectable beyond the confine of the wall forming the slip fitting, and reciprocably movable within the resilient tubular seal such that the side opening of the needle can be opened and closed. Preferably, a projecting, externally threaded shank portion of the slip fitting contains a resilient tubular seal, and it can be threadably engaged with an internally threaded forward portion of the barrel such that reciprocable movement of the needle assembly in one direction causes closure of the valve by movement of the side opening of the needle into the axial opening through the resilient tubular seal, and movement in the other direction causes opening of the valve by movement of the side opening of the needle outside the axial opening of the tubular seal and into communication with the bore of the barrel.

In a particularly preferred embodiment, the flanged portion of the resilient tubular seal under the applied force is extremely thin, is seated against a protruding surface located in the rearward face of the shank portion of the slip fitting, and squeezed and held therein by the forward face of the attached barrel so that a highly effective, leak proof seal able to withstand extraordinarily high pressures, e.g., 500 pounds per square inch, and higher, is formed. The external diameter of the needle itself is greater than that of the axial opening through the tubular seal. Preferred dimensions are described hereafter.

These and other salient features and advantages of the invention will be better understood by reference to the following detailed description which makes specific reference to the attached drawings.

REFERRING TO THE DRAWINGS

FIG. 1 depicts an exploded view of a preferred high pressure syringe embodying the present invention, the apparatus combination including a forward valved needle assembly, a central main barrel portion, and plunger assembly;

FIG. 2 depicts a sectional view of the assembled syringe of the preceding figure, the valved needle assembly portion of the syringe being shown in open position as utilized in withdrawing a fluid specimen from a pressurized source, or as used in injecting a fluid specimen;

FIG. 3 depicts a forward fragmentary view of the assembled syringe of FIG. 2 wherein the valved needle assembly portion of the syringe is shown in closed position; and FIG. 4 depicts a forward fragmentary view of the assembled syringe of FIG. 2, the valved needle assembly portion of the syringe being positioned to permit flushing and cleaning of the needle assembly portion of the syringe.

Referring initially to FIG. 1, there is shown in exploded fashion a syringe 10 which includes generally a valved needle assembly A, constituting the forward portion of the syringe, a main barrel assembly B, which constitutes the central portion of the syringe, and a plunger assembly C, located at the rearward end of the syringe. The valved needle assembly A includes generally a nozzle portion, hub or tubular adapter 11 within which is rigidly fitted a cannula or hollow needle 12. The forward end of the tubular adapter 11, it will be observed, is tapered forwardly or of frusto-conic shape and provided with parallel aligned raised circumferential knurled outer surfaces, while the opposite end of said adapter 11 is of smaller external diameter, cylindrical shaped and sized for a slip fit within the tubular member or slip fitting 13. The tubular adapter 11 is held within the slip fitting 13 via an externally threaded pin 14 which is passed through the reverse faced zee-shaped slot 16 of slip fitting 13, mates and is threadably engagable with an internally threaded opening or tap 15 located near the rearward end of tubular adapter 11. The tubular adapter 11, by virtue of the pin-zee slot combination, is capable of two stages of limited forward movement relative to the slip fitting, and of limited rotation as the tubular adapter 11 is moved through said two stages of limited forward movement. This movement, as will be apparent in subsequent description, permits opening and closing of the valved portion of the syringe, as well as defining a needle wash position. The rearward end of the slip fitting 13 is provided with an externally threaded cylindrical shank portion for mating threadable engagement with the forward internally threaded end of the slotted outer tubular barrel segment 19 of the main barrel assembly B, a seal feature and a projecting lip on which a cushioning O-ring 17 is preferably fitted. The rearward end of needle 12 is projectable all the way through the central or axial opening of the slip fitting 13, and thereover is fitted a resilient tubular seal 18, preferably provided with an enlarged flanged end which faces rearwardly providing both seal and buffer functions.

The main barrel assembly B, as suggested, includes a cylindrical shaped outer barrel 19, the terminal ends of which are tapped with internal threads for threadable engagement with the tubular adapter 11 of the valved needle assembly A, and the plunger assembly C, respectively. An inner tubular member 20 is fitted concentrically within the outer barrel 19, this member resting against the tubular support seal 21 which lines an internal shoulder or section of reduced diameter located near the rearward end of outer barrel 19. The tubular member 20 is generally and preferably constructed of a transparent material such as plastic or glass, is scribed with indicia marks for ease of measurement of fluid specimens drawn therein, and the indicia marks thereon can be readily and easily read or observed through slot 22 of outer barrel 19.

The plunger assembly C, located at the rearward end of the syringe, includes a tubular externally threaded plug 23, provided with a flanged end shoulder 24. The plug 23 is threadably engagable with the rearward internally threaded end of outer barrel 19. A plunger 25, provided with a thumb button 26, is reciprocably mounted within and through the axial opening of the plug 23, the forward end thereof extending into the axial opening of the inner barrel member 20. A stop 28 located intermediate the fixed seal 27 at the forward tip of the plunger 25 and the plug 23 limits the movement of the plunger such that the seal 27 can be moved forward to the rearward end of needle 12 to inject a fluid specimen and rearwardly sufficient to fill the inner barrel member 20 with an accurately measured quantity of a fluid specimen.

Referring to FIG. 2, which shows syringe 10 in assembled form, it will be observed that the needle 12 is mounted within the valved needle assembly near its forward end via a snug fit between the external surface of the needle and the internal surface of the enclosing tapered forward end wall of tubular adapter 11, and at an intermediate position via snug fit between the external surface of a bushing or collar 9, within and through which needle 12 is fitted, and an internal interior wall of tubular adapter 11. The needle 12, it will be observed, contains a wire 8 of external diameter less than the inside diameter of the axial opening through the needle 12. The rearward end of needle 12 is closed, plugged or sealed, but contains a side opening 7 which is provided near the rearward end of the needle 12. The side opening 7 is in open communication with the needle annulus, or annular opening between the external surface of wire 7 and the internal wall of the needle, which in turn communicates with the dispensing end of the needle. The side opening 7 of the needle by virtue of its position within or outside the axial opening through fixed tubular seal 18, within which the needle is laterally movable, can be blocked or opened rearwardly of tubular seal 18 to the axial opening within inner barrel member 20, such that the syringe can be opened or closed, or positioned and opened forwardly of resilient tubular seal 18 to permit washing and cleaning of needle 12.

The valved needle assembly A in its essence provides a valved inlet at the forward end of the syringe which can be opened, as depicted in FIG. 2, to permit ingress of a sample specimen of fluid in accurately measured volume, or closed as shown by reference to FIG. 3, to permit egress and expulsion of such fluid specimen under the positive and forcible action of plunger 25. It will thus be observed that movement of the tubular adapter 11 to its extreme rearward position within slip fitting 13 will thrust the side opening 7 at the rearward end of needle 12 rearwardly and outside tubular seal 18, such that opening 7 lies within the axial opening of inner tubular member 20. Conversely, forward movement of the tubular adapter to an intermediate forward position (such that pin 14 lies within the turn portion of the zee slot 16) will move the side opening 7 into tubular packing 18 and thus close the passageway extending from the annular opening through needle 12 to the bore of inner tubular member 20, which is the position shown by reference to FIG. 3.

In operation, with the valved inlet to the syringe closed, as shown by reference to FIG. 3, the dispensing end of needle 12 of the syringe 10 can be disposed or inserted within a high pressure inlet and then opened as described by reference to FIG. 2 for removal of a pressurized fluid specimen. When the valved inlet portion of syringe 10 is opened, and plunger 25 retracted, the fluid specimen is forced into the annulus of the needle 12, and passes through side opening 7 of the needle 12 into inner tubular member 20, displacing the unfilled volume up to the forward tip of seal 27 of the plunger 25. The rearward movement of plunger 25, which is always adequate to permit withdrawal of increments of the fluid specimen sufficient to fill the bore of inner tubular member 20, is limited by stop 28 which abutts the forward face of plug 23 of the plunger assembly. The valved end of syringe 10 can then be closed, as shown by reference to FIG. 3, and the accurately measured fluid specimen under pressure is thus trapped within the barrel of the syringe. The needle 12 can then be withdrawn from the high pressure inlet, and the dispensing end thereof reinserted within a media, e.g., G-C. inlet, mass spectrometer inlet, into which the fluid specimen is to be injected.

The needle 12 of syringe 10 can be washed and cleaned after usage by movement of the tubular adapter 11 to its extreme forward position within slip fitting 13 which causes the side opening 7 of needle 12 to be thrust outside the forward end of tubular seal 18. By positioning the valved inlet portion of the syringe 10 in this manner, as shown by reference to FIG. 4, a cleaning liquid can be passed, e.g., from the dispensing end of needle 12 through its annulus and the contaminated liquid discharged via side opening 7 to external collection means. In similar manner, the bore of needle 12, if desired, can be gas dried.

The basic novelty of the present combination resides in the needle valve assembly A inclusive of the tubular adapter 11 and needle 12 mounted therein, with its slip fitting 13 and resilient tubular seal 18 inclusive particularly of its flanged end which tightly seals the area of contact between the forward face of inner tubular member 20 and the face of flanged end of said seal such that the seal can withstand extraordinary high pressures. A critical feature of the resilient tubular seal 18 relates to the fact that the flanged portion thereof is seated against the rearward face of the externally threaded projection of slip fitting 13 and covers the surrounding protruding lip 6, and to the thinness of the flanged portion thereof, under pressure the thickness of which, in forming the seal, ranges preferably from about 0.001 to about 0.005 inch, and more preferably from about 0.0015 to about 0.0025 inch. The resilient flanged portion of seal 18 is thus squeezed tightly between the forward end of inner tubular member 20 and protruding lip 6, which provides a thin sealing surface or membrane, which is quite desirable because of the physical presence of the surrounding lip 6 which prevents the material from cold flowing or extruding away from its seating surface forward of inner tubular member 20. A tight seal is also formed by the use of a needle 12 of external diameter slightly greater than that of the axial opening through the resilient tubular member 18, the difference in diameters ranging preferably from about 0.001 to about 0.01 and more preferably from about 0.002 to about 0.005 inch.

The wire 8 located within the needle 12 eliminates much of the dead volume normally associated with conventional needles, this greatly increasing the accuracy and precision of delivery of accurately measured fluid specimens.

In an optional, though less preferred, embodiment, the side opening 7 can be eliminated and the opening relocated in the terminal rearward end of the needle, just forward of a projecting rearward portion of the wire 8. By arranging the needle so that it can be moved forwardly and rearwardly to seat and unseat the terminal end thereof within the forward opening of inner member 20, and thus unblock and block the opening through this member, a generally satisfactory seal can be formed. In accordance with the preferred syringe, however, fluid specimens can be taken from sources under pressures on the order of 500 pounds per square inch, and higher.

The apparatus of the present invention can be constructed of conventional materials, suitably those substantially inert to action by the fluid, or contaminating elements. The external portions of the barrel, the plunger, needle and valved needle assembly, can be conveniently constructed of various metals, e.g., ferrous metals such as iron, iron alloys, steel, stainless steel, and the like; or, e.g., brass, copper, bronze, chrome, and the like. The materials can be of a solid or laminar construction, and can be provided with a protective film, coated, plated, or the like; particularly, those unreactive or impervious to known chemicals contained in the sample fluid. The element forming the inner barrel portion of the barrel assembly can be similarly constructed, but preferably is constructed of rigid forms of plastics, and plasticlike materials, preferably glass. The sealing elements can be constructed of semirigid forms of plastics, such material being particularly desirable in the construction of the forward plunger seal and tubular sealing components. The self-lubricated plastics are especially preferred in this capacity. The polyfluorinated ethylene polymers, notable among which is polytetrafluoroethylene (Teflon), are particularly outstanding. A preferred technique for forming the piston seal is described by reference to U.S. Pat. No. 3,577,850 which issued May 11, 1971.

The resilient tubular seal 18, in particular, is formed of plastic and plastic-like materials, particularly the self-lubricated polymers, notable among which are the polyfluoronated ethylene polymers, outstanding of which is Teflon.

It is apparent that various changes, such as in absolute or relative dimension of the parts, materials used and the like, as well as the suggested mode of taking samples, can be made without departing the spirit and scope of the invention, as will now be apparent to those skilled in the art.

Having described the invention, what is claimed is:

1. In apparatus comprising a syringe useful for receiving and accurately measuring small quantities of a fluid specimen from a pressurized source, for dispensing, the syringe having the usual hollow barrel formed by an enclosing wall providing a bore, a reciprocable plunger fitted in said bore in sliding, sealing relationship therewith, said barrel having a hollow needle with dispensing end located on the opposite end of said barrel, the hollow opening of which is in communication with the bore of said barrel, the improvement which comprises, as a part of the combination, a valved needle assembly which includes a tubular adapter within the axial opening of which the hollow needle is rigidly mounted, said needle containing a wire of external diameter less than the diameter of the internal opening through the needle, the needle being sealed at its rearward end and being provided with a side opening which connects with the annulus which forms an open communication with the dispensing end of the needle, the tubular adapter being slidably mounted within a slip fitting which can be operatively affixed upon the wall which forms the forward end of the barrel, the tubular adapter including a resilient tubular seal mounted therein within the axial opening of which the side opening of the needle can be snugly contained and communication between the openings of the needle and barrel closed or extended through said axial opening thereof and into the bore of the barrel to open communication between the openings of the needle and barrel by movement of the tubular adapter within the slip fitting, whereby, when the communication between the openings of the needle and barrel are closed by containment of the side needle opening inside the resilient tubular seal, the dispensing end of the needle can be inserted into a pressurized source of a fluid specimen, the openings between the needle and barrel can then be opened by projection of the side needle opening through the resilient tubular seal and into the bore of the barrel, such that on retraction of the plunger, a fluid specimen can be withdrawn from the pressurized source by passage thereof from the dispensing end of the needle through the annulus formed between the wire and inside wall of the needle, and via the side opening of the needle into the barrel, and when the communication between the needle opening and barrel is closed by movement of the side opening of the needle into the resilient tubular member, an accurately measured portion of the fluid specimen can be trapped within the barrel for subsequent injection when the dispensing end of the needle is inserted into a media, the communication between the barrel and needle openings reopened, and the plunger pushed forward.

2. The apparatus of claim 1 wherein the slip fitting forming a portion of the valved needle assembly is provided with an externally threaded projecting portion, the rearward face thereof is recessed and the resilient tubular seal is provided with a flanged portion which is seated against a circumferentially disposed projecting lip located within the face of the slip fitting, and the forward end of the barrel is internally threaded for threadable engagement with the externally threaded projecting portion of the slip fitting.

3. The apparatus of claim 2 wherein the resilient tubular seal is constituted of plastic.

4. The apparatus of claim 2 wherein the resilient tubular member is constituted of Teflon, the flanged portion of which, under the force applied by the recessed face of the slip fitting, and forward end of the barrel, at the location of the circumferential lip, ranges in thickness of from about 0.001 to about 0.005 inch.

5. The apparatus of claim 4 wherein the thickness of the flanged portion of the tubular member at the location of the circumferential lip ranges from about 0.0015 to about 0.0025 inch.

6. The apparatus of claim 1 wherein the tubular adapter portion of the needle assembly is of frusto-conic shape tapered in the direction of the dispensing end of the needle mounted therein, is provided with a projecting shank portion of generally cylindrical shape of relatively small diameter, the slip fitting is of tubular design, open forward providing a mating fit with the projecting shank portion of the tubular adapter and provided with a reverse faced zee-shaped slot opening in the wall thereof through which a pin is mounted within the wall of the tubular adapter and extended outwardly to provide restricted movement between the tubular adapter and slip fitting, the resilient tubular seal is fitted within the projecting shank portion of the slip fitting and the projecting portion of said slip fitting is adapted for threadable engagement with an internally forward opening within the wall forming the barrel of the syringe.

7. The apparatus of claim 6 wherein the rearward face of the slip fitting is provided with a face containing a surrounding protruding lip, the resilient tubular seal is provided with a flanged portion which is seated against the projecting lip of the slip fitting, and the tubular seal is constituted of a plastic-like material.

8. The apparatus of claim 7 wherein the resilient tubular seal is constituted of Teflon, and the flanged portion thereof, when squeezed against the lip at the face of the slip fitting, ranges from about 0.001 to about 0.005 inch in thickness.

9. The apparatus of claim 8 wherein the thickness of the flange at the location wherein it is compressed against the lip ranges from about 0.0015 to about 0.0025 inch.

* * * * *